United States Patent
Gell et al.

[15] 3,683,093
[45] Aug. 8, 1972

[54] FURNACES FOR HEATING GLASS

[72] Inventors: Philip Anthony Maunsell Gell, Southbridge; Thomas Hugill Waterwort, Danesford, near Bridgenorth, both of England

[73] Assignee: Element Limited, London, England

[22] Filed: Dec. 16, 1970

[21] Appl. No.: 98,838

[30] Foreign Application Priority Data

Dec. 20, 1969 Great Britain..........62,170/69

[52] U.S. Cl. .................................................13/6
[51] Int. Cl. ...................................................C03 5/02
[58] Field of Search..................................13/6, 23, 24

[56] References Cited

UNITED STATES PATENTS 2,267,537  12/1941  Romazzotti.....................13/6
2,993,079  7/1961   Augsburger.....................13/6
3,182,112  5/1965   Torok...............................13/6
3,417,186  12/1968  Blumenfeld.....................13/6

*Primary Examiner*—Roy N. Envall, Jr.
*Attorney*—Kurt Kelman

[57] ABSTRACT

The invention provides a glass melting furnace in which glass is heated in several parallel adjacent zones by passage of glass between rows of electrodes situated at and defining the lateral boundaries of the zones. The bottom wall of the furnace chamber is formed with a network of channels for withdrawing glass from the lower part of the furnace towards an outlet. The electrode rows are connected to output terminals of an alternating current supply circuit which is fed from a three-phase alternating current supply source and has a transformer means for distributing the electrical load preferably substantially equally to the phases of the polyphase source.

23 Claims, 7 Drawing Figures

Inventors
PHILIP A.M. GELL
THOMAS H. WATERWORTH

By Kurt Kelman
AGENT

Inventors
PHILIP A.M. GELL
THOMAS H. WATERWORTH

By Kurt Kelman
AGENT

FURNACES FOR HEATING GLASS

BACKGROUND OF THE INVENTION

This invention relates to furnaces for heating molten glass of the kind comprising a furnace chamber having a bottom wall and an upstanding peripheral wall for containing glass in the molten state, electrodes disposed within the chamber and spaced apart in plan for passing electrical current through the gate, and an electrical supply circuit for supplying alternating electric current to the electrodes. Said furnaces are herein referred to as being of the kind specified.

The term "glass" is used herein to mean vitreous materials generally.

It is generally recognized that in melting glass by the employment of furnaces of the kind specified, it is desirable to attain heating of the body of molten glass contained in the furnace chamber in as uniform a manner as possible.

Ideally, this would occur, were there to be no heat loss from the peripheral walls and the bottom wall of the furnace chamber and were the glass to be traversed by current flowing between electrodes disposed adjacent to opposed portions of the peripheral wall and which was of uniform density across the entire cross-sectional area of the body of glass, taken in a plane at right angles to the direction of current flow.

In practice a number of factors combine to prevent attainment of this ideal. One of these is that it is not usually possible to supply alternating current from a single phase supply source, since most electrical distribution systems involve the transmission of alternating current by way of a polyphase supply system (usually three phase) and to place on a single one of the phases the load entailed by supplying all the current required for a commercial glass melting furnace, would produce an unacceptable degree of unbalance in the supply system.

Another problem which would arise, even in cases where single phase loading could be accepted, is that for large furnaces magnitude of the voltage difference supplied between opposed pairs of electrodes gives rise to insulation difficulties impairing the safety of operating personnel. At the operating temperatures in question the peripheral wall and the bottom wall of the furnace chamber are inevitably, to some extent, electrically conducting. Therefore, these walls tend to partake of the voltage level established at the adjacent position in the molten body of glass. For large furnaces the length of current paths through the glass may be considerable and consequently voltage levels require to be higher than can be accepted with safety.

Electrical loading of a three phase or other polyphase supply without incurring an unacceptable degree of unbalance involves certain problems in the layout or arrangement of the electrodes in the furnace chamber. Under certain conditions one solution which provides balanced, or approximately balanced, loading is represented by a furnace wherein the electrodes comprise at least one set of four electrodes two of which are situated along one part of the peripheral boundary of a body of glass, as viewed in plan, and of which the other two are situated along an opposed generally parallel apart of the boundary, and the power supply circuit includes alternating voltage sources furnishing respective phase voltages presenting magnitudes and a relative phase difference represented at least approximately by lines joining diagonally opposed electrodes of the set, to which diagonally opposed electrodes these voltage sources are connected respectively.

One such arrangement forms the subject of U.S. Pat. No. 3,440,321 Philip Anthony Maunsell Gell et al.

In a typical arrangement, wherein the supply source is a three-phase source, transformer means are provided to convert the three-phase source to a two-phase source, and the two phases are then applied respectively across diagonally opposed electrodes of the set.

The problem of electrical safety due to voltage levels also arises, as previously explained, in cases where the magnitude of the voltage difference between the diagonally opposed pairs of electrodes requires to be raised due to the size of the furnace and length of current path between such diagonally opposed pairs of electrodes.

Such conditions arise in the case of large furnaces for high melting rates in respect of so called "soft" glasses, for example soda lime glasses, typically in cases where the throughput is required to be from 80 tons per day upwards. Similar problems are encountered in the melting of "hard" glasses, such as borosilicate glass, and in these cases the problems arise in furnaces which are designed to provide a throughput of 25 tons per day and upwards.

Further, while in many cases the arrangement of diagonally opposed pairs of electrodes is satisfactory, the configuration of some furnace chambers (determined by considerations other than electrode arrangement) is not invariably compatible with this particular electrode arrangement, and an arrangement affording greater flexibility as to layout is desirable.

One object of the present invention is to provide a new or improved arrangement of electrodes and supply circuit whereby these difficulties are avoided or reduced.

In furnaces of the kind specified it is desirable that the treatment to which different portions of the body of molten glass contained in the furnace chamber is subjected from the time at which such portion is first present in the chamber to the time at which it leaves by way of the outlet shall not present such variations as are likely to lead to non-uniformity of the quality, composition, or physical characteristics of the glass leaving the outlet. A further object of the invention is to provide an improved combination of electrode arrangement and glass withdrawal system with a view to minimizing differences in residence time of any given portion of the glass within the furnace chamber.

SUMMARY OF THE INVENTION

According to one aspect the invention provides a furnace comprising a furnace chamber for containing glass in the molten state having a bottom wall and an upstanding peripheral wall, upstanding rod-like electrodes arranged within the chamber in respective rows defining the lateral boundaries of a plurality of adjacent heating zones, collectively occupying substantially the whole of the furnace chamber, an alternating current supply circuit having input terminal means for accepting supply from a polyphase source of alternating current, output terminals each connected to one or more of said rows of electrodes to apply a voltage across each heating zone and establish the passage of alternating electric current therethrough between adjacent rows of electrodes for heating the glass, transformer means controlling distribution of the electrical load resulting from said passage of current through the glass in said heating zones to the phases of said polyphase source.

From a further aspect the invention provides a furnace comprising a furnace chamber for containing glass in the molten state having a bottom wall and an upstanding peripheral wall, upstanding rod-like electrodes arranged within the chamber in respective rows defining the lateral boundaries of a plurality of adjacent heating zones, an alternating current supply circuit having input terminals for accepting supply from a polyphase source of alternating current, output terminals each connected to one or more of the rows of electrodes to apply a voltage across each heating zone and hence establish alternating current traversing the glass at said zone laterally for heating same, transformer means controlling the distribution of the electrical load resulting from said current flow in said heating zones to the phases of said polyphase source, channel means in a lower part of said furnace chamber for withdrawing glass therefrom towards an outlet from each of said heating zones whereby stagnation or inequality of dwell or residence time of glass in any of said heating zones relatively to the remainder is reduced.

BRIEF DESCRIPTION OF THE DRAWINGS

The invention will now be described, by way of example, with reference to the accompanying drawings wherein.

DESCRIPTION OF THE PREFERRED EMBODIMENTS

Figure 1:
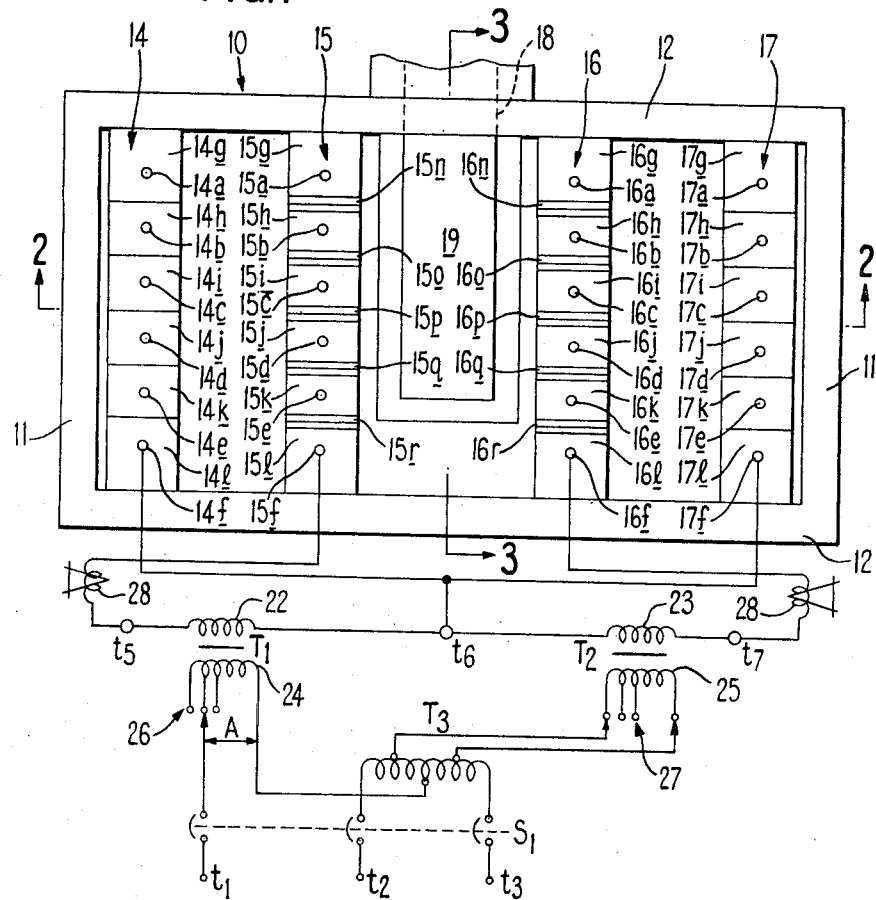
FIG. 1 is a somewhat diagrammatic plan view illustrating one embodiment of the invention incorporating both aspects thereof.
Figure 2:
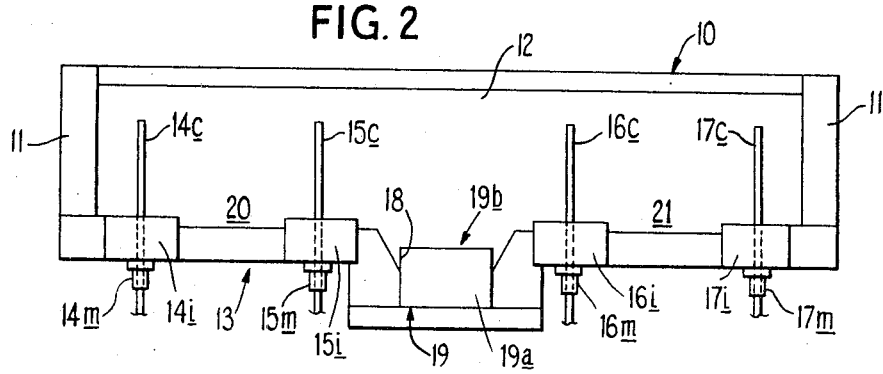
FIG. 2 is a fragmentary cross-sectional view on the line 2—2 of FIG. 1.
Figure 3:
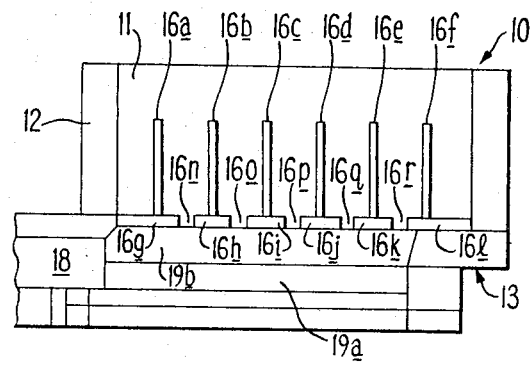
FIG. 3 is a fragmentary cross-sectional view on the line 3—3 of FIG. 1.

Referring firstly to the embodiments of FIGS. 1 to 3, the furnace chamber 10 as seen in plan is of rectangular form having peripheral walls including a shorter pair 11 (herein referred to as end walls) and a longer pair 12 (herein referred to as side walls) and a bottom wall 13.

For heating the glass a plurality of upstanding rod-like electrodes extend through the bottom wall 13. These electrodes may be of any suitable construction. Typically they are formed of molybdenum or other electrically conductive metal which is refractory at the temperature of the molten glass and does not react adversely therewith chemically or physically.

The electrodes are arranged in four rows 14, 15, 16 and 17 and as shown the electrodes in each row are spaced apart equi-distantly from each other, such electrodes being designated by the reference applied to the row with an appropriate suffix $a$ to $f$ as shown.

Each electrode is capable of vertical adjustment through the bottom wall of the furnace so that its upper end can be placed at a predetermined distance below the normal level of molten glass contained in the chamber.

It will be understood that the furnace chamber may be used as a melting chamber in which case solid state glass making materials or batch as they are commonly termed will be fed into the chamber and will form a batch crust floating on the surface of the already molten glass. Alternatively, the invention may be applied to a chamber in which already molten glass is fed for further heating, as, for example, to refine the glass.

Each of the electrodes is provided with a cooling means designated $14m$ to $17m$ as seen in FIG. 2, and which may comprise a jacket through which cooling fluid either in liquid or gaseous form, or combination of such fluids, are circulated.

Where the electrodes extend upwardly through the bottom wall 13 of the furnace chamber, such bottom wall includes raised parts. Preferably such raised parts are constituted by block elements again designated by a reference numeral pertaining to the row with a suffix, for example $14g$ to $14l$.

The block elements have upwardly presented faces which typically are raised about 2 to 6 inches above the adjacent upwardly presented face of the bottom wall 13. The block elements may be formed from a material known as Zircofrax (registered trade mark) marketed by The Carborundum Company Limited, or a material known as Monofrax.

Both these materials are composed of zirconium ortho-silicate and are available in forms to withstand an operating temperature up to 1,700° C. These materials are more highly resistant to abrasion and chemical attack by constituents of the glass melt than is sillimanite at the operating temperatures attained during operation of the furnace, which latter material may be used for the construction of the remaining part of the bottom wall.

At least in respect of the rows 15 and 16, the corresponding block elements are spaced apart to provide gaps or spaces between them, as indicated particularly in FIG. 3 at $16n$ to $16r$.

The bottom wall of the furnace chamber presents a system of channels for the withdrawal of glass to an outlet which may be considered as the aperture, indicated in broken lines, 18 and one of the side walls 12. Such channels comprise a collector channel 19 which extends in a central region of the furnace chamber between the two end walls 11 parallel to the latter, and which has a base portion $19a$ of generally rectangular form in vertical cross-section and an upper portion $19b$ the sides of which are upwardly divergent.

The block elements of the rows 15 and 16 define feeder channels constituted by the gaps or spaces $15n$ to $15r$ and $16n$ to $16r$ which extend transversely to the length of the collector channel 19 and are in communication therewith at the laterally inwardly presented sides of the block elements concerned, and serve to allow glass to flow from a layer adjacent to the bottom wall in a direction laterally inwardly towards the collector channel 19.

In each of the rows 14 to 17 the blocks collectively form the lateral boundaries of a further feeder channel, two such being seen in FIG. 2 at 20 and 21 which communicate with the already mentioned feeder channels.

The system of feeder channels establishes a pattern of flow paths for withdrawal of glass towards the outlet 18 in the layer of glass adjacent to the bottom wall of the furnace chamber, and thereby prevents or minimizes the incidence of stagnation in any particular locality.

It will be understood that the provision of the blocks constituting the raised parts has the effect of raising the level of the lowest current path between adjacent rows of electrodes. This is desired to prevent layers of glass in contact with the bottom wall of the furnace becoming overheated and prematurely causing erosion of the bottom wall. It is, therefore, most desirable that the particular configuration presented by the bottom wall be such as to counteract any tendancy to stagnation, and the system of feeder channels above described in combination with the collector channel 19 effectively contributes to this end.

The particular pattern of withdrawal of glass will also tend to promote downflow of glass adjacent to the end walls 11 between these and the adjacent outermost rows of electrodes 14 and 17. The block elements of the rows 14 and 17 designedly do not afford gaps or spaces similar to those shown at 15n to 15r and 16n to 16r, so that the cooler glass descending adjacent to the end walls 11 cannot be trapped in such spaces where it would not be subjected to effective heating, since all the electrodes of a given row are at the same electrical potential. Instead such glass passes directly into the heating zones between the rows 14 and 15 and the rows 16 and 17 at a level above the further feeder channels 20 and 21 and so will immediately be subjected to relatively strong heating by current passing along short paths between the electrodes of the two rows respectively.

Referring now to the supply circuit as shown in FIG. 1, this is designed to be supplied with current from a three-phase alternating current source at input terminals $t1$, $t2$, $t3$, and has output terminals $t5$, $t6$ and $t7$. The output terminals are connected to the input terminals through the intermediary of a switch S1, and transformer means providing for conversion from three-phase to two-phase supply (the three-phase voltages being at phase angles of 120° to each other, and the two-phase voltages being in quadrature or approximately so).

To this end the transformer means comprises two separate transformers T1 and T2 having secondary windings 22 and 23 connected in series with each other establishing terminal $t6$ as a common terminal to the two quadrature phase voltages presented, and terminals $t5$ and $t7$ as uncommoned terminals.

Primary windings 24 and 25 are connected in circuit with an inductive impedance which may be an autotransformer T3. A center tap is connected to one end of the primary winding 24, two equi-distantly spaced taps one on each side of the center tap are connected to the primary winding 25, and the ends of which are connected through sections of the switch S1 to the input terminals $t2$ and $t3$, while terminal $t1$ is connected to the other end of primary winding 24. It will be noted that both primary windings 24 and 25 have a plurality of tapping points 26 and 27, any of which can be employed selectively with respect to the connection to input terminal $t1$ and the connection to transformer T3 respectively.

The two outermost rows 14 and 17 of electrodes are connected to the common output terminal $t6$ while the two inner rows 15 and 16 are connected respectively to the two uncommoned output terminals $t5$, $t7$.

Accordingly respective phase voltages in quadrature are developed between electrode rows 14 and 15 on the one hand and electrode rows 17 and 16 on the other hand. The voltage developed between electrode rows 15 and 16 is the voltage resulting from vector addition of the two two-phase voltages and hence has a value equal to the phase voltage value multiplied by $\sqrt{2}$.

Accordingly the physical lateral spacing of the electrodes in the rows 15 and 16 may be greater than that between the rows 14 and 15 or the rows 16 and 17. The relationship between the spacings of the electrode rows should preferably be such as to maintain about the same voltage gradient through the glass in each of the heating zones between the electrode rows. In practice, due to the central position of the heating zone between the rows 15 and 16, heat losses will tend to be somewhat smaller in this region and hence glass resistance somewhat lower, so that the spacing between the rows 15 and 16 may be rather greater than $\sqrt{2}$ times the spacing between the electrode rows 14, 15 and 16, 17.

The supply circuit may include current regulating means 28 in one or more of the conductors connecting respective rows of electrodes to an associated output terminal $t5$ to $t7$. Adjustment of the regulating means 28 and of the connection to the selectively usable tapping points 26 and 27 enables the electrical loading represented by current flow across each heating zone between electrode rows 14, 15; 15, 16; and 16, 17; to be distributed to the phases of the supply source at terminals $t1$, $t2$, $t3$. The arrangement results in some degree of unbalance in the loading of the three-phase supply but only to an extent which is generally acceptable.

It will be appreciated that the electrical load in each of the heating zones, although normally approximately equal, may also be designedly set to be of different value to provide greater heating in one or more of the zones relatively to the remainder, in coordination with a rate of glass withdrawal from each zone which, notwithstanding the existence of the channel system, may present some variation.

In general terms it will be evident that the electrode arrangement, system of feeder channels, and supply circuit provide an extremely flexible means for ensuring that the whole of the glass in the furnace chamber is properly heated for the required duration, and hence provides a flow of uniformly treated glass at the outlet 18, while at the same time enabling the electrical loading of the supply source to be controlled in the desired manner.

It is convenient to utilize uniform spacing of electrodes in each row. However, it will be understood that this spacing may be varied along the length of the row if desired. Thus, for example, the inner electrodes of a row, such as 14b, 14c, 14d and 14e, may be spaced from each other by a distance which is rather greater than the spacing between the outer electrodes 14a, 14b and 14e, 14f and would tend to compensate for lower heat loss and rather higher glass temperature in the mid region of a row. It will be noted that the spacing between successive electrodes in any given row is less than the spacing between this row and the adjacent row or rows.

Again, although the rows of electrodes are shown as rectilinear, it would be within the scope of the invention for non-rectilinear rows to be used. For example, the outer rows 14 and 15 may be bow-shaped or of arcuate form with their concave sides facing either inwardly or outwardly according to conditions of operation of the furnace. The inner rows 15 and 16 may have a like curvature which may be somewhat less severe than that of the outer rows.

Although not illustrated, it will be understood that heat may be supplied to the glass as it is being withdrawn through the collector channel by means of a further electrode placed in a continuation of the channel 19, or in a further furnace chamber to which the glass is withdrawn. Such electrode may be connected in any suitable source of alternating current voltage to establish the required current longitudinally of the collector channel.

In the further embodiments illustrated in FIGS. 4 to 7, the furnace chamber for simplicity is illustrated in a highly diagrammatic form and a separate showing of the raised parts and feeder channel system is omitted, although it is to be understood that it may be present, for example in the form disclosed in FIGS. 1 to 3 with modifications appropriate to the different number of rows of electrodes.

In these arrangements parts corresponding to those already described are designated by like references and the preceding description is to be deemed to apply.

Figure 4:
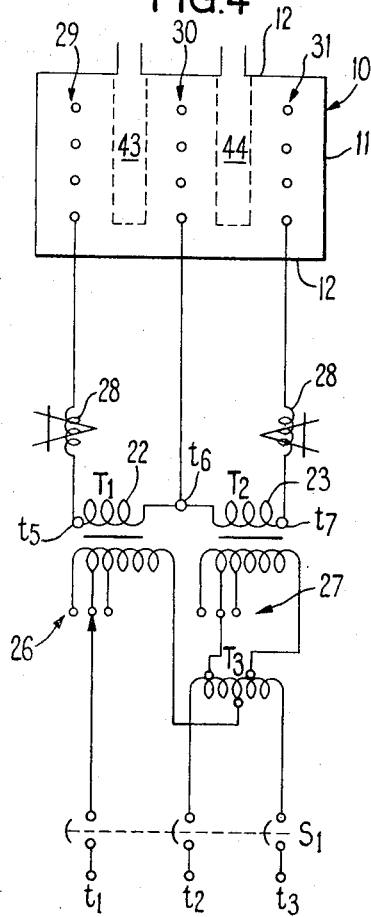
FIGS. 4, 5, 6 and 7 illustrate diagrammatically in plan further embodiments of the invention.

In the arrangement of FIG. 4 there are only three rows of electrodes. These are designated 29, 30, 31 since they do not correspond exactly to the rows of electrodes in the previously described embodiment. An even number, namely 2, of heating zones are defined. Each secondary winding 22, 23 supplying one of the phase voltages of the quadrature two-phase supply is applied across a respective heating zone, namely between electrode rows 29, 30 and 30, 31 respectively.

Instead of providing a single collector channel, each of the heating zones has its own collector channel 43, 44. These may feed separate outlets, or possibly a common outlet.

The arrangement provides balanced loading of the three-phase supply.

Figure 5:
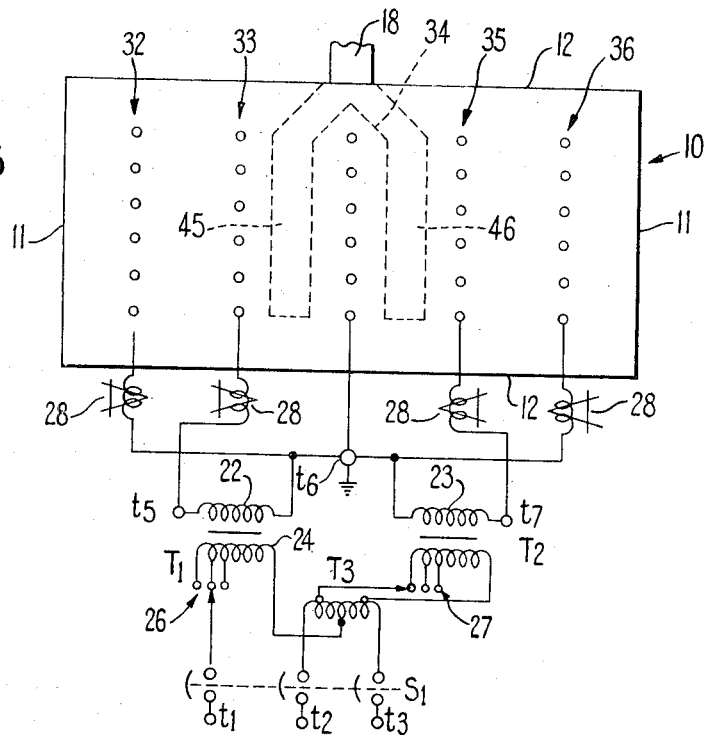

In the embodiment illustrated in FIG. 5 like numerals of references designate components already described. In this case there are five electrode rows designated 32 to 36, again defining an even number, namely 4, of heating zones.

In this case respective secondary windings 22, 23 of the transformers T1, T2 each supply two heating zones, namely between electrode rows 32, 33 and 33, 34 on the one hand, and 34, 35 and 35, 36 on the other hand. This arrangement also provides balanced loading of the three-phase supply.

Since the exact center between the end walls of the furnace chamber is occupied by the row 34 of electrodes, collector channels may be provided in both of the adjacent zones, as indicated diagrammatically at 45 and 46. As shown these feed a common outlet 18. It will be noted that the outlet 18 is opposite to the electrode row 34 and by earthing the terminal t6, as shown, it can be ensured that the glass at the outlet is also at earth potential.

In any of the arrangements herein described, where this condition is not met, and yet it is desired that the glass at the outlet shall not be above, or appreciably above, earth potential, an earthing electrode can be provided at the outlet or adjacent thereto, thereby ensuring that current is not transmitted to any ancilliary apparatus operating on the glass at the outlet.

Figure 6:
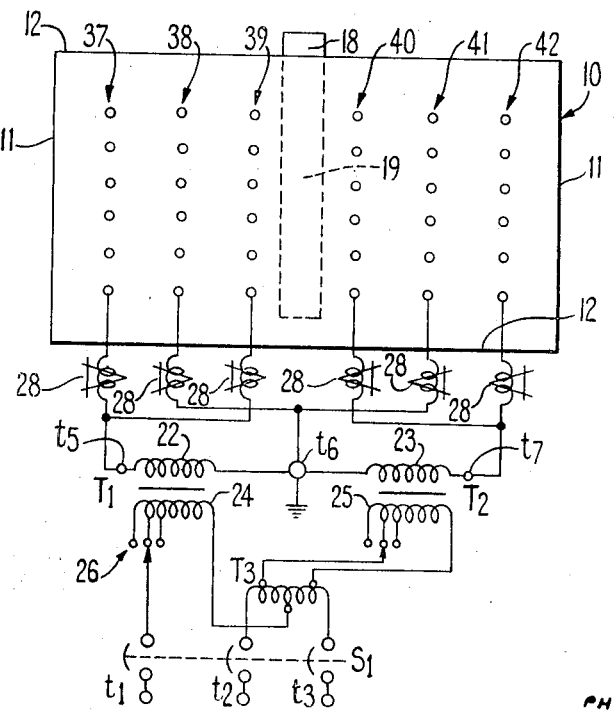

In a further embodiment illustrated in FIG. 6 parts already described are designated by like numerals of reference. In this case there are six electrode rows defining an odd number, namely 5, of heating zones, such rows being designated 37 to 42.

In this case the secondary winding 22 of transformer T1 supplies two of the heating zones, namely between rows 37, 38 and 38, 39, whilst secondary winding 23 of transformer T2 supplies the heating zone defined between rows 40, 41 and 41, 42.

The remaining heating zone defined between electrode rows 39, 40 is fed with the voltage equivalent to the vectorial addition of the phase voltages on windings 22, 23 presented at the uncommoned terminals t5, t7.

It will be evident that the arrangements illustrated in FIGS. 1 to 6 all utilizing basically the same form of transformer means provide an extremely flexible supply circuit, in the sense that it is capable of satisfactory use in both an odd number and an even number of heating zones, and for considerable variation in the number of such heating zones.

Figure 7:
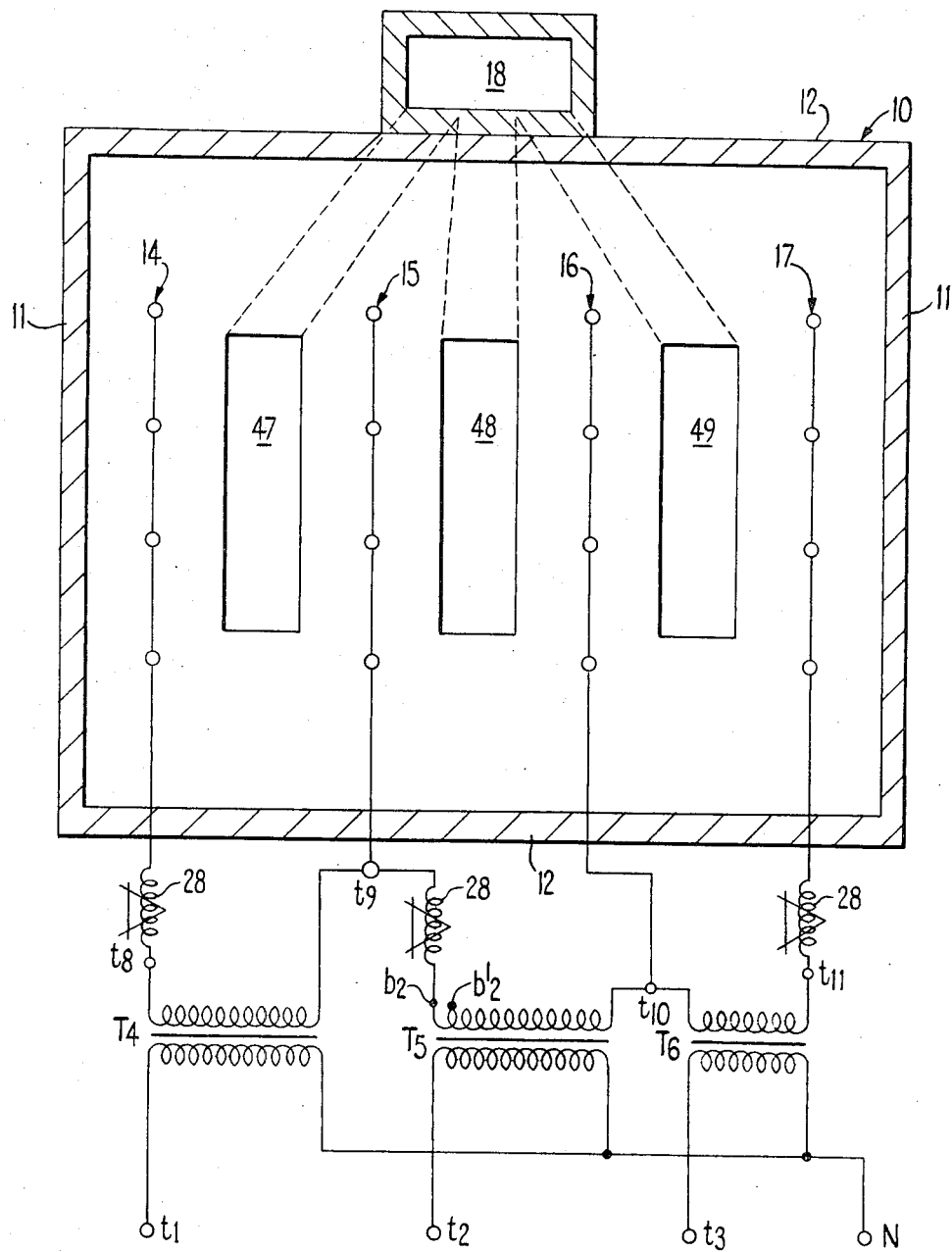

In the embodiment illustrated in FIG. 7 parts corresponding to those already described are designated by like references. There are two main differences in this embodiment. Firstly, instead of having a single collector channel situated centrally between the end walls 11 of the furnace chamber, a collector channel is provided in each heating zone as indicated at 43, 44 and 45.

Further, the supply circuit has input terminals designed to accept input from a three-phase star connected supply source having a neutral pole which would be connected to the input terminal designated N.

The supply circuit does not provide conversion from three-phase to two-phase but provides conversion from a three-phase star connected supply to a three-phase delta connected supply with the secondary windings of transformers T4, T5, T6 connected in series to an open delta configuration presenting output terminals t8, t9, t10, t11. It will, of course, be understood that, since the glass contained in the furnace chamber is electrically conductive, the glass itself does constitute the connection between electrode rows 14 and 17 and, therefore, the delta arrangement of the secondary windings is "open" only in the sense that there is no short circuit or direct electrical connection between the two outer terminals t8, t11 of the secondary windings of transformers T4, T6. The electrodes may, as before, extend upwardly through raised parts in the form of block elements and those of the rows 15, 16 would preferably be spaced apart longitudinally of the row to provide gaps or spaces such as those already referred to in connection with FIG. 1 providing transverse feeder channels.

The supply circuit illustrated in FIG. 7 is also suitable for use in a further embodiment (not illustrated) in which there are six heating zones defined by seven rows of electrodes. In this case each secondary winding could be connected to feed a respective pair of the heating zones. In both cases loading of the three-phase supply is balanced.

The above described embodiments are representative of a much larger number of electrode arrangements involving different numbers of rows and different numbers of electrodes in each row which are within the scope of the invention.

In general selection of the number of rows may be determined by the shape and plan dimensions of the furnace chamber should other considerations dictate the adoption of a particular shape. Further, it is desired to avoid the establishment of voltages in excess of about 600 volts between adjacent rows for reasons already indicated.

We claim:

1. A furnace comprising:
   a. a furnace chamber for containing glass in the molten state having a bottom wall and an upstanding peripheral wall,
   b. upstanding rod-like electrodes arranged within the chamber in respective rows defining the lateral boundaries of a plurality of adjacent heating zones, each having a length exceeding its lateral dimension, and collectively occupying substantially the whole of the furnace chamber,
   c. an alternating current supply circuit having
      i. input terminals for connection respectively to the poles of a polyphase source of alternating current,
      ii. output terminals each connected to one or more of said rows of electrodes
      iii. transformer means
      iv. conductor means connecting said transformer means in a configuration between said input and output terminals to apply a voltage across each of said heating zones, and
      v. regulator means for adjusting said voltages relatively to each other.

2. A furnace according to claim 1 wherein:
   a. the number of heating zones is equal to the number of phases of the polyphase source multiplied by a whole number
   b. the transformer means includes a number of primary windings and a number of secondary windings each equal in number to the number of phases of the source,
   c. said secondary windings are connected to said output terminals and therethrough to the rows of electrodes in such a manner that each secondary winding applies voltage across the same number of heating zones as do the remaining secondary windings.

3. A furnace according to claim 1 wherein:
   a. the input terminals are connected to a three-phase alternating current source,
   b. the transformer means includes primary and secondary windings connected by said conductor means for effecting conversion from said three-phase source to develop two-phase output voltages at said output terminals,
   c. the total number of said heating zones is an even number,
   d. said output terminals are connected to said rows of electrodes in a manner such that each of said two phase voltages is applied across an equal number of said heating zones.

4. A furnace according to claim 1 wherein:
   a. the input terminals are connected to a three-phase source,
   b. the transformer means includes primary and secondary windings for effecting conversion from said three-phase source to develop two-phase output voltages in quadrature with each other at said output terminals, one of said output terminals being common with respect to said output voltages and two non-common with respect to said output voltages,
   c. the total number of the heating zones is an odd number,
   d. said output terminals are connected to said rows of electrodes in such a manner that each of said output voltages is applied across an equal number of said heating zones, and an additional one of said heating zones is bounded laterally by rows of electrodes connected respectively to said non-common output terminals.

5. A furnace according to claim 1 wherein:
   a. said input terminals are connected to a three-phase alternating current source,
   b. the transformer means comprises separate transformers each including a respective secondary winding and a respective primary winding,
   c. said respective secondary windings are connected in series with each other to provide a common one of said output terminals and two non-common ones of said output terminals,
   d. said respective primary windings are connected by said conductor means in circuit with a further transformer to said input terminals.

6. A furnace comprising:
   a. a furnace chamber for containing glass in the molten state having a bottom wall and an upstanding peripheral wall,
   b. upstanding rod-like electrodes arranged within the chamber in respective rows defining the lateral boundaries of a plurality of adjacent heating zones,
   c. an alternating current supply circuit having
      i. input terminals for connection respectively to the poles of a polyphase source of alternating current,
      ii. output terminals each connected to one or more of said rows of electrodes
      iii. transformer means,
      iv. conductor means connecting said transformer means in a configuration between said input and output terminals to apply a voltage across each of said heating zones, and
      v. regulator means for adjusting said voltages relatively to each other.
   d. at least one outlet in said furnace chamber for outflow of glass therefrom,
   e. channel means in a lower part of said furnace chamber including channels extending from each of said zones to said outlet whereby stagnation or inequality of dwell or residence time of glass in any of said heating zones relatively to the remainder is reduced.

7. A furnace according to claim 6 wherein:

a. said channel means includes:
  i. a collector channel leading from a central region of said bottom wall to said outlet,
  ii. feeder channels extending transversely of said collector channel to convey glass thereto from heating zones spaced laterally from said collector channel.

8. A furnace according to claim 7 wherein said channel means includes further feeder channels extending longitudinally of respective heating zones and communicating with the first said feeder channel.

9. A furnace according to claim 6 wherein said channel means is defined by raised parts of said bottom wall of said furnace, through which raised parts said electrodes extend.

10. A furnace according to claim 9 wherein:
  a. said raised parts, through which said electrodes extend in at least those rows other than the rows situated at lateral boundaries of said furnace chamber, are separated from each other by gaps or slots defining the first said feeder channels.

11. A furnace according to claim 9 wherein said raised parts comprise block elements which are structurally separate from the remainder of said bottom wall of said furnace chamber and are made of a material which is selected to have a resistance to erosion under operating conditions of the furnace which is greater than that provided by those parts of said bottom wall relatively to which said block elements are raised.

12. A furnace according to claim 7 wherein said collector channel is situated beneath a portion of the glass in said furnace chamber which is at or near earth potential.

13. In a furnace comprising an elongate furnace chamber for containing glass in the molten state having a bottom wall and upstanding side and end walls extending respectively along the longer and shorter peripheral boundaries of the bottom wall through which latter respective rod-like electrodes extend, the improvement wherein:
  a. the rod-like electrodes are arranged within the chamber in respective rows each extending generally parallel to said end walls and each containing more than two of said electrodes, said rows defining lateral boundaries of a plurality of laterally adjacent heating zones having lateral dimensions less than their lengths between said side walls of said chamber,
  b. said heating zones collectively occupy substantially the whole of said furnace chamber,
  c. said furnace chamber has at least one outlet adjacent a respective one of said side walls,
  d. said bottom wall includes means defining channels extending from said heating zones to said outlet,
  e. an alternating current supply circuit is connected to said electrodes to provide respective voltages across said heating zones.

14. The improvement claimed in claim 13 wherein said loading of said polyphase source is at least approximately balanced.

15. A furnace according to claim 1 wherein:
  a. each of said rows of electrodes includes more that two electrodes,
  b. in each of said rows successive electrodes are spaced apart by a distance less than the least lateral dimension of the heating zone or zones bounded laterally by said row.

16. A furnace according to claim 6 wherein:
  a. said channel means includes a plurality of collector channels each extending longitudinally of a respective one of said heating zones,
  b. said furnace chamber has outlets communicating respectively with said collector channels.

17. A furnace according to claim 6 wherein:
  a. said channel means includes a plurality of collector channels each extending longitudinally of a respective one of said heating zones,
  b. said furnace chamber has a single outlet communicating with each of said collector channels.

18. A furnace according to claim 13 wherein the channels include:
  a. a channel extending longitudinally within each of said heating zones,
  b. channels extending laterally of said heating zones connecting each of said longitudinally extending channels with laterally adjacent ones thereof.

19. A furnace according to claim 18 wherein:
  a. said laterally extending channels extend between adjacent electrodes in said rows,
  b. said adjacent electrodes extend upwardly through respective raised portions of said bottom wall having upwardly presented surfaces above the bottoms of said channels.

20. A furnace according to claim 19 wherein said electrodes in rows situated adjacent to said end walls extend upwardly through raised portions of said bottom wall contiguous with said end walls and extending continuously therealong between said side walls.

21. A furnace according to claim 18 wherein the furnace chamber has a single outlet at a position on the mid-region of the length of one of said side walls.

22. A furnace according to claim 13 wherein:
  a. the channels include channels extending longitudinally within each heating zone,
  b. an outlet is provided in said chamber at an end of each of said zones.

23. A furnace comprising:
  a. a furnace chamber for containing glass in a molten state having a bottom wall and an upstanding peripheral wall,
  b. upstanding rod-like electrodes arranged within the chamber in respective rows defining the lateral boundaries of a plurality of adjacent heating zones and collectively occupying substantially the whole of the furnace chamber, each of said rows comprising at least three electrodes spaced apart from each other longitudinally of the row by a distance less than the minimum lateral dimension of a heating zone of which said row defines a lateral boundary,
  c. an alternating supply circuit having
    i. input terminals for connection respectively to the poles of a polyphase source of alternating current,
    ii. output terminals each connected to one or more of said rows of electrodes,
    iii. transformer means,
    iv. conductor means connecting said transformer means in a configuration between said input and output terminals to apply a voltage across each of said heating zones, and
    v. regulator means for adjusting said voltages relatively to each other.

* * * * *